US008456671B2

(12) United States Patent
Kiyoshige

(10) Patent No.: US 8,456,671 B2
(45) Date of Patent: Jun. 4, 2013

(54) COMMUNICATION SYSTEM, INFORMATION STORAGE DEVICE, MANAGEMENT DEVICE, AND TERMINAL DEVICE

(75) Inventor: Ryuichi Kiyoshige, Yokohama (JP)

(73) Assignee: Olympus Corporation, Hachioji-shi, Tokyo (JP)

(*) Notice: Subject to any disclaimer, the term of this patent is extended or adjusted under 35 U.S.C. 154(b) by 497 days.

(21) Appl. No.: 12/471,658

(22) Filed: May 26, 2009

(65) Prior Publication Data
US 2009/0296149 A1 Dec. 3, 2009

(30) Foreign Application Priority Data
May 27, 2008 (JP) .............................. P2008-138142

(51) Int. Cl.
*G06F 3/12* (2006.01)
(52) U.S. Cl.
USPC ............. 358/1.15; 370/245; 370/295.42; 709/224; 709/229; 710/19; 710/62
(58) Field of Classification Search
USPC ................. 358/1.15; 709/223, 229
See application file for complete search history.

(56) References Cited

U.S. PATENT DOCUMENTS

| 7,860,963 | B2* | 12/2010 | Matsuoka et al. | 709/223 |
| 7,907,292 | B2* | 3/2011 | Suzuki | 358/1.15 |
| 2006/0294251 | A1* | 12/2006 | Cocotis et al. | 709/229 |
| 2007/0070417 | A1* | 3/2007 | Ito | 358/1.15 |
| 2008/0275945 | A1* | 11/2008 | Tanimoto | 709/203 |
| 2009/0021781 | A1* | 1/2009 | Yoon | 358/1.15 |

FOREIGN PATENT DOCUMENTS

| JP | 2000-339115 A | 12/2000 |
| JP | 2003-330656 A | 11/2003 |
| JP | 2006-185105 A | 7/2006 |

OTHER PUBLICATIONS

English Machine Translation of JP 2003-330656-A (Sumio, published Nov. 21, 2003).*
English Machine Translation of JP 2000-339115-A (Tomitaka, Published Dec. 8, 2000).*
English Machine Translation of JP 2006-185105-A (Fujikura, Published Jul. 13, 2006).*
Japanese Office Action dated Aug. 28, 2012, issued in corresponding Japanese Patent Application No. 2008-138142, (5 pages). With English Translation.
Japanese Office Action dated Jun. 5, 2012, issued in corresponding Japanese Patent Application No. 2008-138142, with English Translation (5 pages).

* cited by examiner

*Primary Examiner* — Benny Q Tieu
*Assistant Examiner* — Juan M Guillermety
(74) *Attorney, Agent, or Firm* — Westerman, Hattori, Daniels & Adrian, LLP

(57) ABSTRACT

A communication system, information storage device, management device, and terminal device which enable information transmission which takes into consideration the circumstances on the receiving side, are provided. An external equipment 9 transmits to a commanding device 4 service information, indicating the type of service which it itself provides and the service execution priority or the service state. The commanding device 4 stores the received service information, and transmits the service information to an image capture device 1. The image capture device 1 selects the external equipment 9 as the transmission destination for content information based on the received service information, and transmits the content information.

13 Claims, 7 Drawing Sheets

| HOST NAME (IP) | SERVICE NAME | OPERATING STATE | PRIORITY |
|---|---|---|---|
| HOST1 | xxxService | Ready | HIGH |
| 192.168.0.2 | yyyService | Busy | HIGH |
| HOST3 | XxxService | Refuse | NORMAL |
| HOST3 | YyyService | Ready | LOW |
| ⋮ | ⋮ | ⋮ | ⋮ |
| HOSTX | zZzService | Stop | LOW |

COMMUNICATION SYSTEM, INFORMATION STORAGE DEVICE, MANAGEMENT DEVICE, AND TERMINAL DEVICE

BACKGROUND OF THE INVENTION

1. Field of the Invention

This invention relates to a communication system having one or more terminal devices which process content information according to service details, a management device which manages information with regard to service provided by the terminal device, and an information storage device which retains content information. This invention further relates to an information storage device, management device, and terminal device constituting the system.

Priority is claimed on Japanese Patent Application No. 2008-138142, filed May 27, 2008, the content of which is incorporated herein by reference.

2. Description of the Related Art

Communication systems which transmit image data to external equipments (image reception devices, printing devices, and similar) on a network from an image capture device are known. Patent Reference 1 describes a method in such a communication system. In order to monitor the state of external equipment, in which output mode information of a printing device is acquired and managed, an output mode settings screen program which can be displayed on various terminals is generated, and the output mode settings screen program is transmitted to various terminals.

Patent Reference 1: Japanese Unexamined Patent Application, First Publication No. 2003-330656

SUMMARY OF THE INVENTION

A first aspect of the present invention relates to a communication system which includes: one or more terminal devices which process content information according to service details; a management device which manages service information indicating the type of service provided by the terminal device, the execution priority of the service, or the service state; and an information storage device which retains the content information, in which the terminal device has a first storage portion which stores the service information, and a first transmission portion which transmits the service information to the management device; the management device has a first reception portion which receives the service information from the terminal device, a second storage portion which stores the service information received by the first reception portion, and a second transmission portion which transmits the service information stored by the second storage portion to the information storage device; and the information storage device has a third storage portion which stores the content information, a second reception portion which receives the service information from the management device, a selection portion which selects the terminal device as the transmission destination for the content information based on the service information, and a third transmission portion which transmits the content information to the terminal device selected by the selection portion.

In accordance with a second aspect of the present invention, in the communication system, the terminal device is further provided with a first control portion which, when a change in the service information has occurred, updates the service information stored in the first storage portion, and controls the first transmission portion so as to transmit the updated service information to the management device, and the management device is further provided with a second control portion, which controls the first reception portion so as to receive the updated service information from the terminal device, and based on the received updated service information, updates the service information stored by the second storage device.

A third aspect of the present invention relates to an information storage device which includes: a storage device, which stores content information; a reception device, which receives service information from a management device which manages service information indicating the type of service provided by a terminal device which processes content information and the execution priority of the service or the state of the service; a selection portion, which selects the terminal device to be the transmission destination of the content information, based on the service information; and a transmission portion, which transmits the content information to the terminal device selected by the selection portion.

A fourth aspect of the present invention relates to a management device: which includes a reception portion, which receives, from a terminal device which processes content information, service information indicating the type of service provided by the terminal device, which processes content information and the execution priority of the service or the state of the service; a storage portion, which stores the service information received by the reception portion; and a transmission portion, which transmits the service information stored by the storage portion to an information storage device, which stores the content information, and which transmits the content information to the terminal device selected based on the service information.

A fifth aspect of the present invention relates to a terminal device, which processes content information according to service details, which includes: a storage portion, which stores service information indicating the type of service and the execution priority of the service or the state of the service; and a transmission portion, which transmits the service information to a management device, which selects the terminal device based on the service information, and which manages the service information for transmission to the information storage device, which transmits the content information it retains.

DETAILED DESCRIPTION OF THE INVENTION

Figure 1:
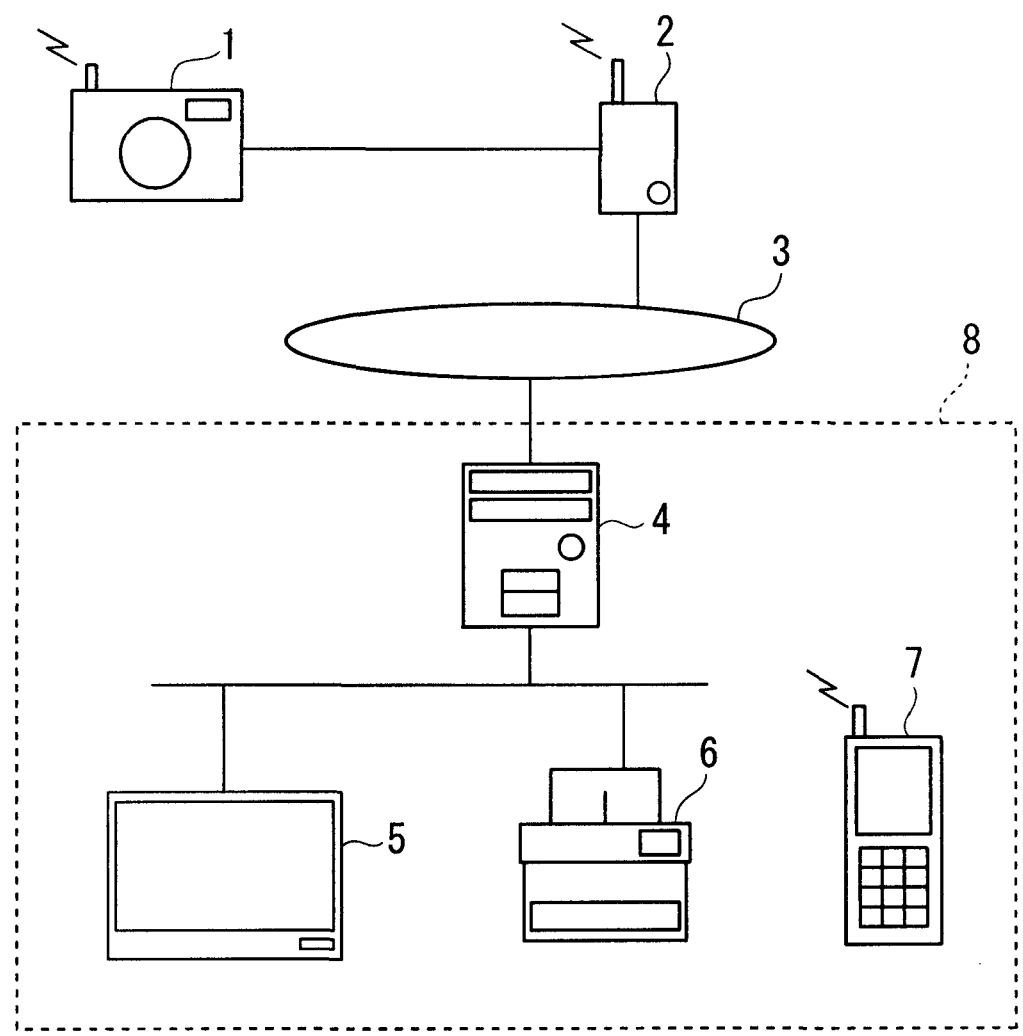
FIG. 1 is a block diagram showing a configuration of a system in accordance with an embodiment of the present invention.

Below, embodiments of the present invention are explained referring to the drawings. FIG. 1 shows a configuration of a system in accordance with an embodiment of the present invention. The system shown in FIG. 1 includes an image capture device 1, an AP (Access Point) 2, the Internet 3, a commanding device 4, an image-receiving device 5 (television or the like), a printing device 6, and a portable telephone terminal 7. In the present embodiment, before the image capture device 1 transmits image data to external equipment existing on a network, an advance notice message giving advance notice of transmission is transmitted to the external equipment. For this reason, the image capture device 1 accesses the external equipment in the private network (home network) 8 via the Internet 3.

The image capture device 1 has a communication function in addition to an image capture function, and connects with the AP 2 by a wireless LAN or other communication method. The AP 2 is connected to the Internet 3, and has a global IP address. The image capture device 1 connected to the AP 2 acquires a global IP address and connects to the Internet 3.

The commanding device 4, which is a server in the private network 8, manages the states of various equipment (image-receiving device 5, printing device 6, and portable telephone terminal 7) having functions for processing the image data. Also, the commanding device 4 is connected to the Internet 3, and has a global IP address. The image-receiving device 5, printing device 6, and portable telephone terminal 7 connected to the commanding device 4 have private IP addresses. The image capture device 1 cannot specify individual equipment within the private network 8 to perform communication. Hence, the image capture device 1 and the various equipments within the private network 8 communicate via the commanding device 4. In this case, the commanding device 4 functions as a proxy server. The image-receiving device 5, the printing device 6, and the portable telephone terminal 7 are terminal devices, each of which process the image data in order to provide predetermined services (display, printing, storage, and the like).

Figure 2:
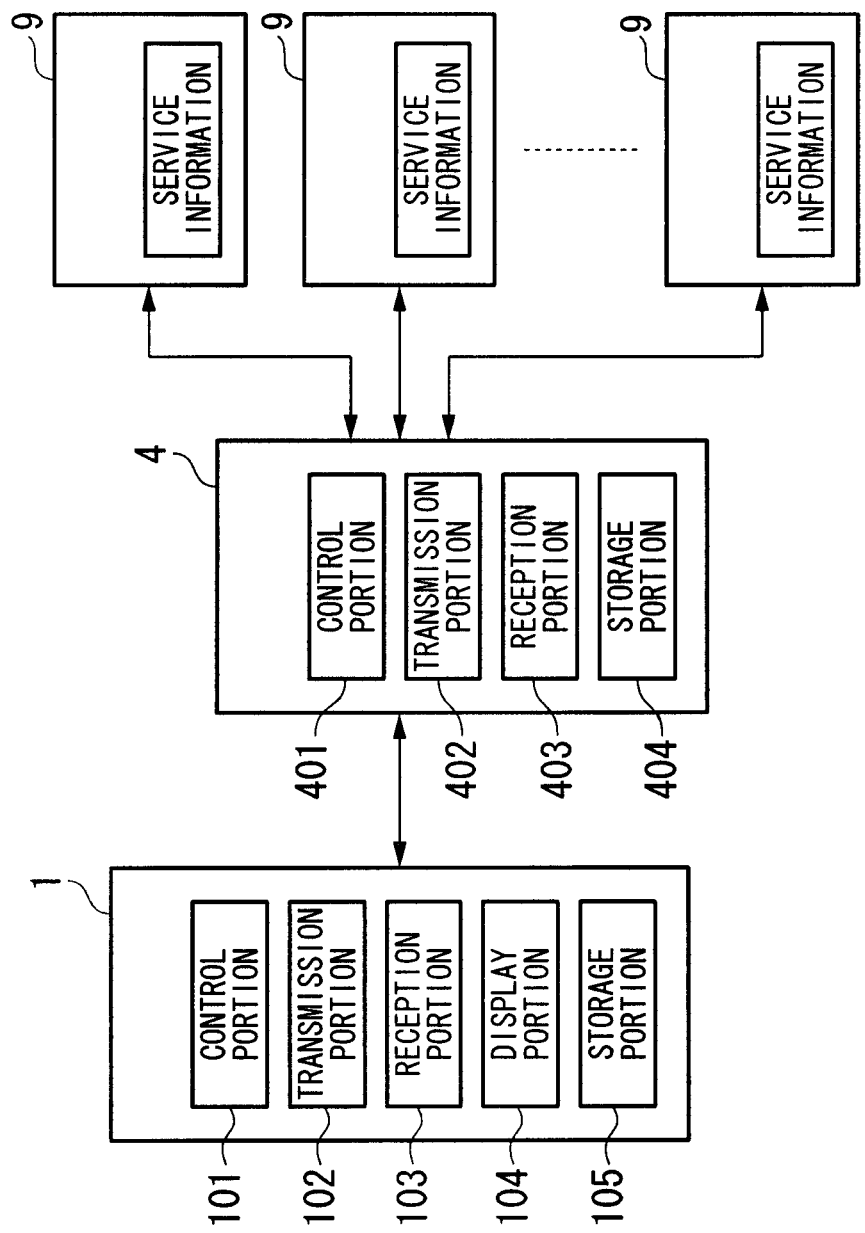
FIG. 2 is a block diagram showing a configuration of each device in the system in accordance with an embodiment of the present invention.

FIG. 2 shows the configuration of the various devices in the system. The image capture device 1 includes a control portion 101, a transmission portion 102, a reception portion 103, a display portion 104, and a storage portion 105. The control portion 101 controls each of the portions within the image capture device 1. The transmission portion 102 has a function for transmitting to the commanding device 4 service request messages, which requests service information relating to a service provided by an external equipment 9, as well as a function for transmitting the image data stored in the storage portion 105 to the external equipment 9. The reception portion 103 has a function for receiving response messages transmitted from the commanding device 4. The display portion 104 displays various information of which the user using the image capture device 1 is to be notified. The storage portion 105 stores the image data (content information) created by image capture in the image capture device 1.

The commanding device 4 includes a control portion 401, a transmission portion 402, a reception portion 403, and a storage portion 404. The control portion 401 controls the various portions within the commanding device 4. The transmission portion 402 has a function for transmitting service request messages to the external equipment 9, as well as a function for transmitting, to the image capture device 1, response messages to service request messages from the image capture device 1. The reception portion 403 has a function for receiving service request messages from the image capture device 1, as well as a function for receiving response messages and service change notification messages from the external equipment 9. The storage portion 404 stores service information acquired from the external equipment 9.

The external equipment 9 has a function for storing service information, a function for receiving service request messages from the commanding device 4, and a function for transmitting response messages and service change notification messages to the commanding device 4. When there has been a change in its own service information (a change in the power supply on/off state, a change in the service settings, or the like), the external equipment 9 updates the service information which it stores.

Service information in accordance with the present embodiment includes the service type, the service execution priority, the service state, and the IP address of the external equipment 9. The service type indicates display, printing, storing, or the like. The service execution priority indicates the priority for execution of the service; the higher the priority, the more readily the external equipment 9 providing this service is selected as the transmission destination for the image data. The service state indicates a reception-possible state, a busy state, a power off state, a reception refused state, or the like. If reception is possible, the external equipment 9 providing this service is selected as the transmission destination for the image data. However, if the state is the busy state, the power off state, or the reception refused state, the external equipment 9 providing this service is not selected as the transmission destination for the image data.

Figure 3:
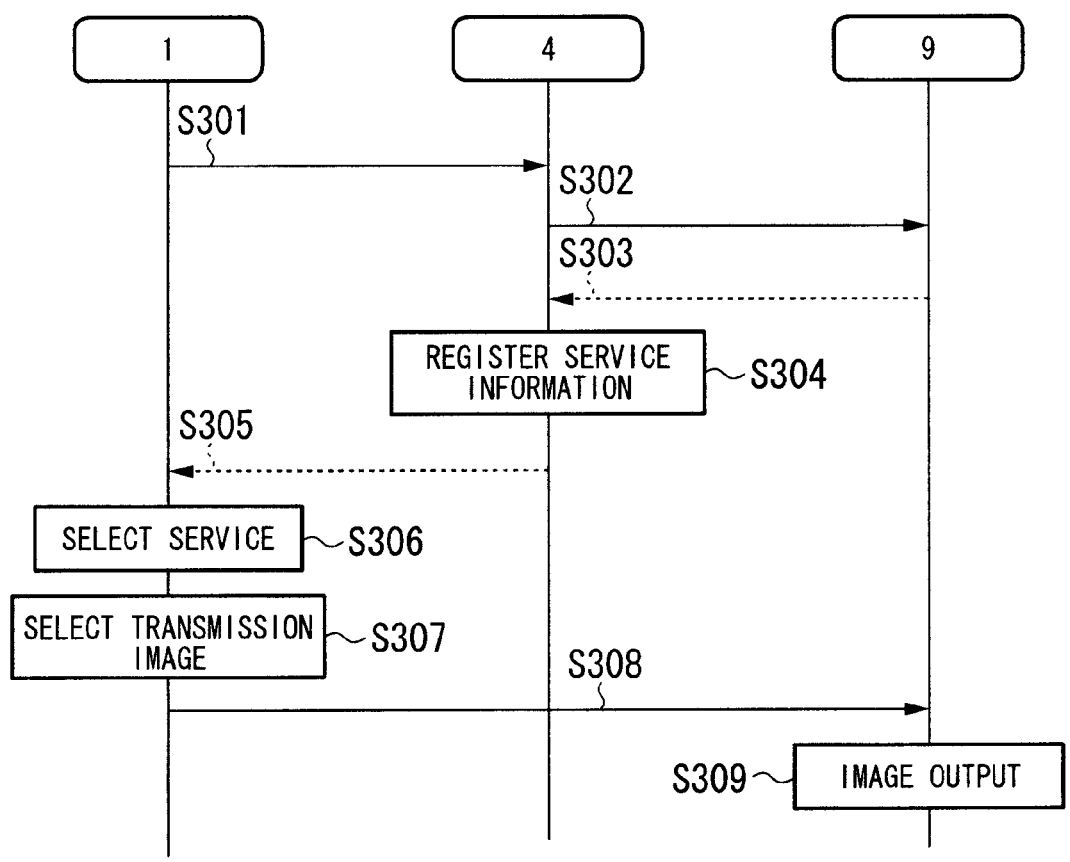
FIG. 3 is a sequence diagram showing an operation of the overall system in accordance with an embodiment of the present invention.

Next, operation of the overall system is explained referring to FIG. 3. The image capture device 1 has a communication function for connecting to a network, and by connecting to the AP 2 via a wireless LAN or other communication method, connects to the Internet 3. Next, the image capture device 1 executes the following processing in order to transmit the image data to the external equipment 9 existing on the private network 8.

First, in order to discover services on the network, the image capture device 1 transmits the service request message to the commanding device 4 (step S301: request service information). Having received the service request message from the image capture device 1, the commanding device 4 transmits a service request message to each of the external equipments 9 in the private network 8 where the commanding device 4 is included (step S302: request service information). The service request message from the commanding device 4 is, for example, transmitted to each of the external equipments 9 as a multicast message.

Upon receiving the service request message from the commanding device 4, the external equipment 9 transmits, to the commanding device 4, a response message including information on its own service (step S303: respond with service information). The commanding device 4 registers, in an internal storage device, the service information includes in the response message received from the external equipment 9 (step S304), and also transmits the response message including the service information to the image capture device 1 (step S305: respond with service information).

The image capture device 1 receives response messages from the commanding device 4, and based on the service information included in the response message, selects a service suitable for printing of an image or some other purpose (step S306). Further, the image capture device 1 selects the image data for transmission to the external equipment 9 (step S307). Through the processing of the above step S301 to S306, the image capture device 1 can specify the external equipment 9 within the private network 8, and can directly request service execution for a service provided by the external equipment 9.

Next, the image capture device 1 transmits the image data selected in step S307 to the external equipment 9 (step S308: transmit selected image). Upon receiving the image data, the external equipment 9 performs image output (image display, image printing, or the like) (step S309). The processing of step S307 may be performed before the processing of step S301.

Figure 4:
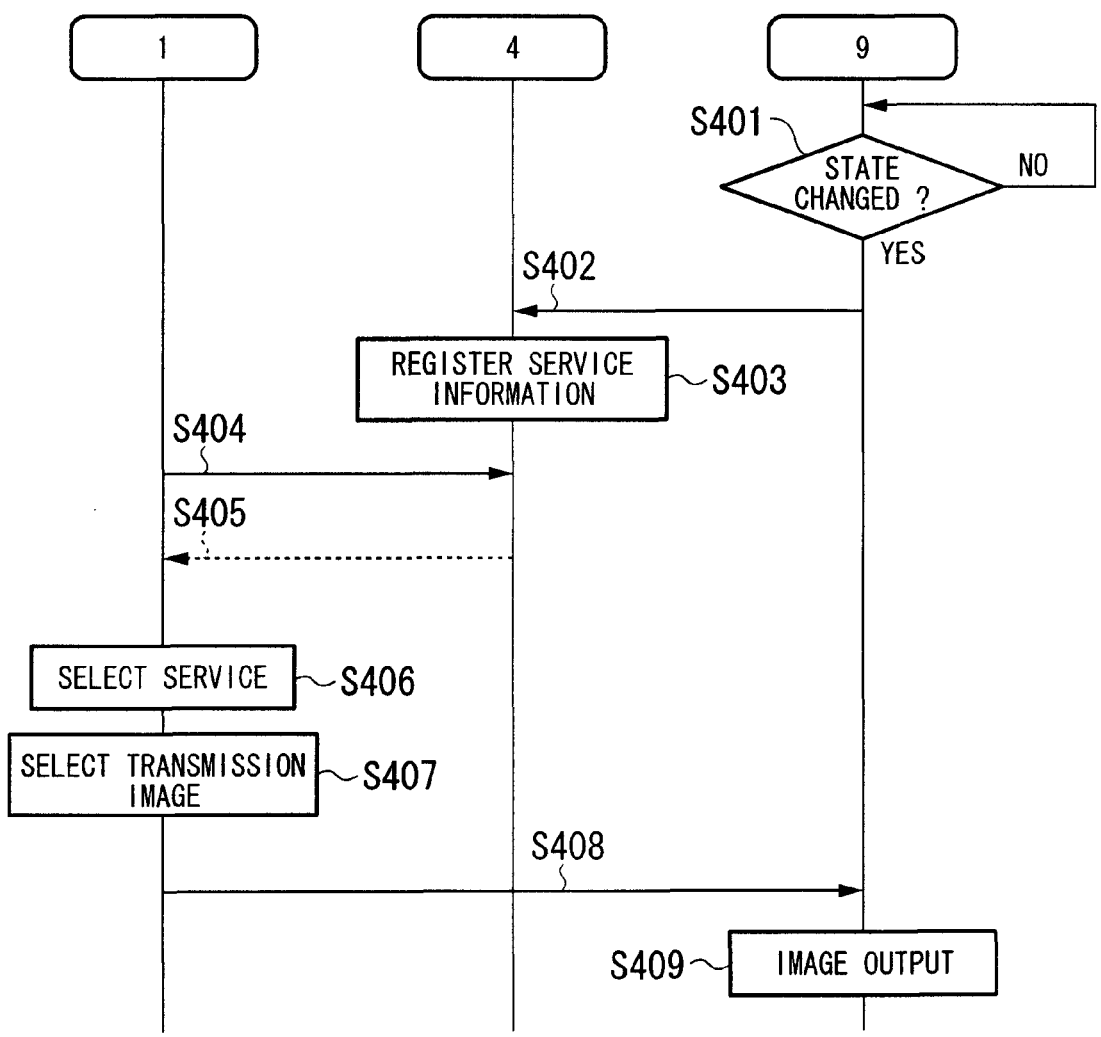
FIG. 4 is a sequence diagram showing an operation of the overall system in accordance with an embodiment of the present invention.

Next, another operation of the overall system is explained referring to FIG. 4. In the operation shown in FIG. 3, the external equipment 9 notifies the commanding device 4 of service information based on a request for service information from the commanding device 4. However, in the operation shown in FIG. 4, the external equipment 9 notifies the commanding device 4 of service information each time there is a change in the service state.

The external equipment 9 constantly detects changes in the service state (step S401), and when a change in the service state is detected, transmits to the commanding device 4 a state change notification message giving notification of a change in the service state. Then the external equipment 9 transmits a service change notification message including service information to the commanding device 4 (step S402: transmit service change notification). The commanding device 4 registers and holds, in an internal storage device, service information included in a service change notification message received from the external equipment 9 (step S403). Accordingly, the state of the external equipment 9 is constantly managed by the commanding device 4.

The image capture device 1, for which a service execution request has occurred, transmits a service request message to the commanding device 4 in order to discover services on the network (step S404: request service information). Upon receiving the service request message from the image capture device 1, the commanding device 4 transmits to the image capture device 1 the response message including service information which it holds (step S405: respond with service information).

The image capture device 1 receives the response message from the commanding device 4, and based on the service information included in the response message, selects a service suitable for image printing or the like (step S406). Further, the image capture device 1 selects the image data for transmission to the external equipment 9 (step S407). Through the processing of the above steps S401 to S406, the image capture device 1 can specify the external equipment 9 within the private network, and can directly request service execution for the service provided by the external equipment 9.

Next, the image capture device 1 transmits the image data selected in step S407 to the external equipment 9 (step S408: transmit selected image). Upon receiving the image data, the external equipment 9 performs image output (image display, image printing, or the like) (step S409). The processing of step S407 may be performed before step S404.

Figure 5:
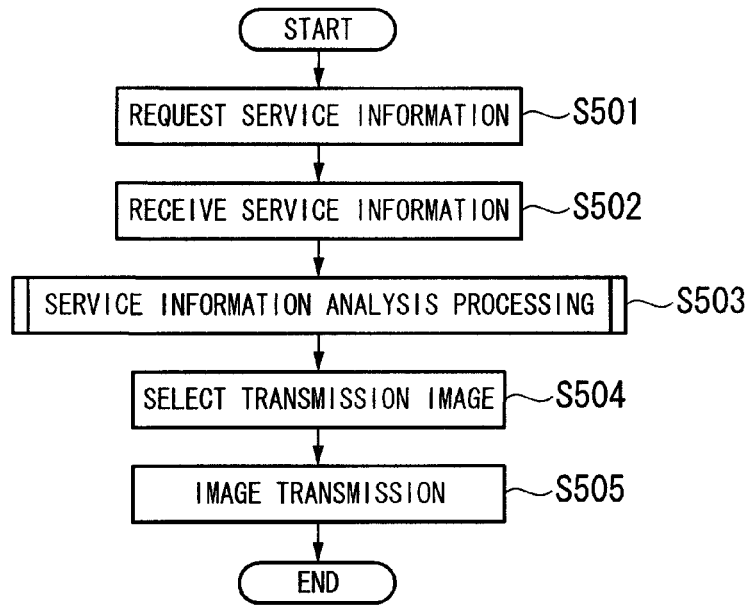
FIG. 5 is a flowchart showing operation of the image capture device in accordance with an embodiment of the present invention.

Next, operation of the image capture device 1 is explained in greater detail, referring to FIG. 5. The image capture device 1 transmits a service request message to the commanding device 4 in order to discover services on the network (step S501). This processing is executed by the control portion 101 and transmission portion 102 of the image capture device 1.

After transmission of the service request message, the image capture device 1 receives a response message from the commanding device 4 (step S502). The processing of step S502 is performed by the reception portion 103 of the image capture device 1. Next, the image capture device 1 analyzes the service information included in the response message, and executes service information analysis processing to select a service (step S503). The processing of step S503 is executed by the control portion 101 of the image capture device 1. Further, the image capture device 1 selects the image data to be transmitted to the external equipment 9 (step S504). This selection of image data is executed by the control portion 101 of the image capture device 1, based on information input by the user via a user interface of the image capture device 1.

After selection of the service and image data, the image capture device 1 transmits the image data to the external equipment 9 (step S505). The processing of step S505 is executed by the transmission portion 102 of the image capture device 1. When a single external equipment 9 provides a plurality of types of service, information indicating the type of service an execution of which is desired is also transmitted to the external equipment 9 together with the image data, and the image data is allocated to the desired service according to this information.

Figure 6:
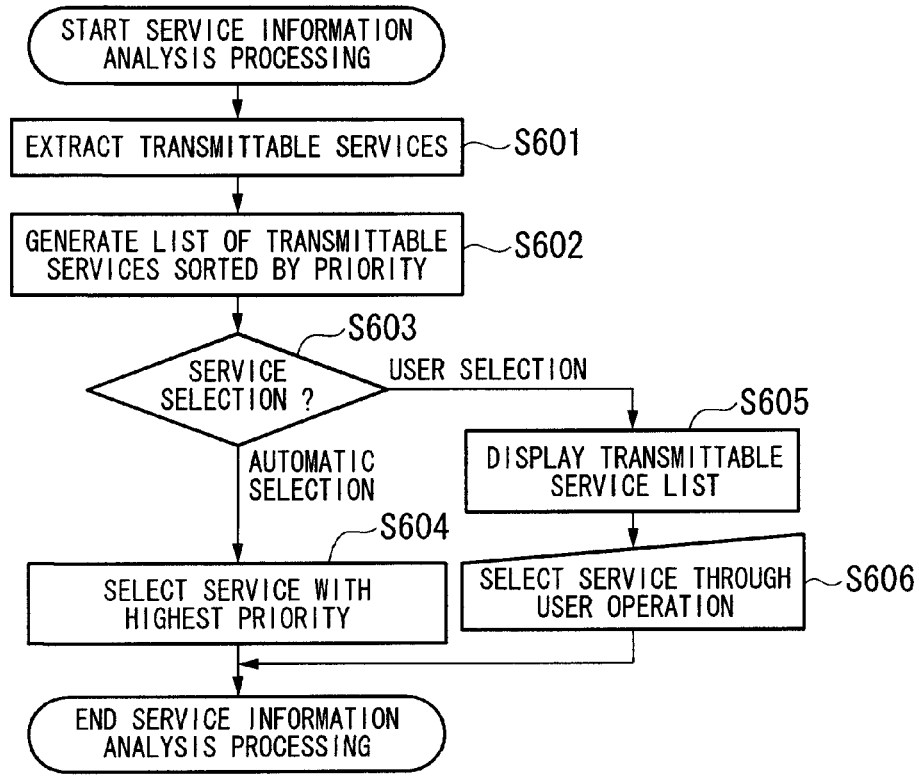
FIG. 6 is a flowchart showing operation of the image capture device in accordance with an embodiment of the present invention.

Next, details of the service information analysis processing in step S503 are explained, referring to FIG. 6. The following processing is executed by the control portion 101 of the image capture device 1. The image capture device 1 extracts services which can be transmitted from the service information included in the response message received from the commanding device 4, based on information indicating service states (step S601). At this time, services, information of which indicating service states receivable, are extracted.

After service extraction, the image capture device 1 generates a list of extracted services, sorted in the order of priority of execution, from among service information relating to extracted services, based on information indicating service execution priorities (step S602). Next, the image capture device 1 determined whether to perform service selection automatically or allow the user to select the service (step S603). The determination of step S603 is performed based on information set in advance in the image capture device 1.

When it is determined that service selection is to be performed automatically, the image capture device 1 selects the service with the highest execution priority among the services included in the list generated in step S602 (step S604). Also, when it is determined that the user is to be allowed to select a service, the image capture device 1 displays, on its own display portion, the list generated in step S602, and prompts the user to select a service (step S605). The user performs service selection through the user interface of the image capture device 1 (step S606). The service type and IP address are associated by the service information, and when the service is selected in the above step S604 or S606, the external equipment 9 having the IP address corresponding to the service is selected as the transmission destination.

Figures 8, 9:
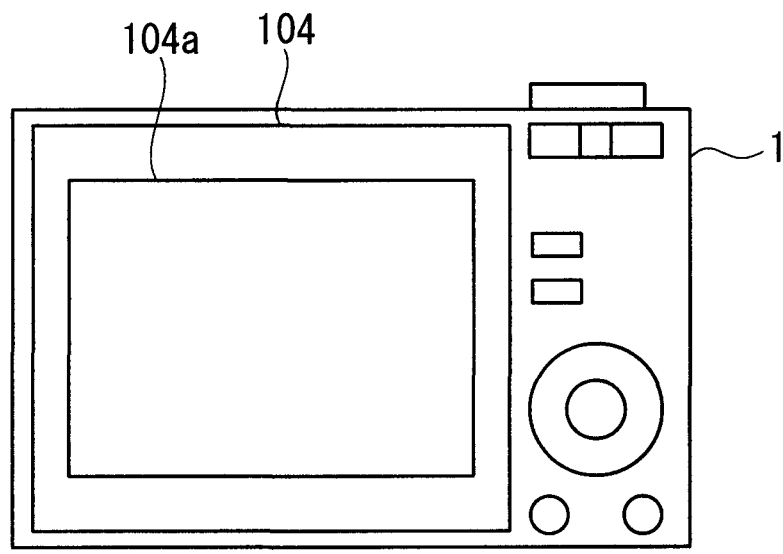
FIG. 8 shows a list displayed by an image capture device in accordance with an embodiment of the present invention.
FIG. 9 is a reference diagram showing list contents displayed by an image capture device in accordance with an embodiment of the present invention.

FIG. 8 shows the manner of display of a list 104a on the display portion 104 of the image capture device 1. FIG. 9 shows an example of contents of the list 104a. The list 104a is displayed in a table format; the first column displays the host name or IP address of external equipments 9 providing services. The second column displays the service names provided by the external equipments 9. The third column displays the operating state of the services. The fourth column displays service execution priorities. In step S606, the user selects the desired service based on the contents of the above list 104a.

Figure 7:
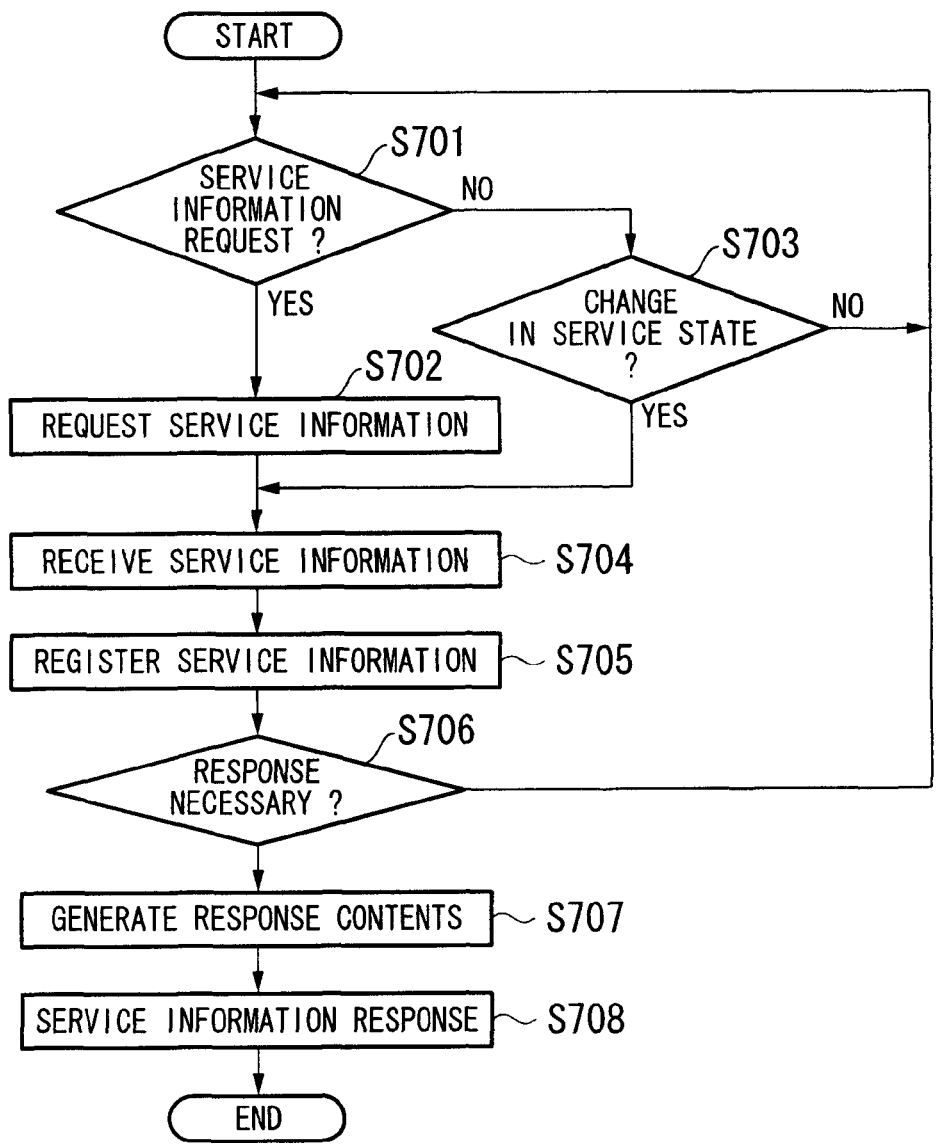
FIG. 7 is a flowchart showing operation of the commanding device in accordance with an embodiment of the present invention.

Next, operation of the commanding device 4 is explained in greater detail, referring to FIG. 7. The operation shown in FIG. 7 can correspond to the operation of the commanding device 4 shown in either FIG. 3 or FIG. 4. The following processing is executed by the control portion 401 of the commanding device 4. The commanding device 4 determined whether or not there is a service request message from the image capture device 1 (whether a service request message has been received) (step S701). When a service request message has been received from the image capture device 1, the commanding device 4 generates a service request message, and transmits the message to external equipments 9 (step S702). After step S702, processing proceeds to step S704.

When there has been no service request message from the image capture device 1, the commanding device 4 determines whether or not there has been a state change notification message from external equipments 9 (whether a state change notification message has been received) (step S703). When there has been no state change notification message from external equipments 9, processing returns to step S701. When there has been a state change notification message from external equipments 9, the commanding device 4 receives a response message including service information or a service change notification message from the external equipment unit 9 (step S704). Next, the commanding device 4 registers, in an internal storage device, the service information included in the response message or service change notification message received from the external equipment 9 (step S705). At this time, when service information for the same service is already registered, the commanding device 4 updates the service information previously registered with the latest service information.

After service information registration, the commanding device 4 determines whether or not response to the image capture device 1 is necessary (step S706). This determination is performed based on the type of message received in step S704. If the message received in step S704 was a state change notification message, the commanding device 4 determines that response to the image capture device 1 is not necessary. In this case, processing returns to step S701. If the message received in step S704 is a response message, the commanding device 4 determines that response to the image capture device 1 is necessary, generates a response message including service information (step S707), and transmits to the image capture device 1 (step S708).

As explained above, in accordance with the present embodiment, the external equipment 9 is selected as the transmission destination for image data based on the service execution priority or service state, according to the circumstances on the receiving side, so that data transmission which takes into consideration circumstances on the receiving side can be performed. Also, by performing service selection automatically in the image capture device 1, the user can be spared the need for troublesome operations.

In the above, embodiments of the present invention have been explained in detail with reference to the drawings, but the specific configuration is not limited to those of the above embodiments. Design modifications and the like which do not deviate from the scope of the invention are also included. For example, the device which transmits data to equipment providing services may be a device other than an image capture device (for example, a portable telephone terminal). Also, the data for transmission may be data other than image data (for example, music data).

In accordance with the present invention, since the terminal device which is to be the transmission destination of content information is selected based on the service execution priority or service state according to the circumstances on the receiving side, it is advantageous in that information transmission which takes into consideration circumstances on the receiving side can be performed.

What is claimed is:

1. A communication system, comprising:
a plurality of terminal devices which processes received content information according to service details, the plurality of terminal devices being connected to a private network, a management device which is connected to the private network, the managing device managing service information indicating a type of the service provided by each of the terminal devices, an execution priority of the service and a state of the service, and
an information storage device which retains the content information, wherein
the terminal device comprises:
a first storage portion which stores the service information, and
a first transmission portion which transmits the service information to the management device;
the management device comprises:
a first reception portion which receives the service information from the terminal device,
a second storage portion which stores the service information received by the first reception portion, and
a second transmission portion which transmits the service information stored by the second storage portion to the information storage device via the Internet; and
the information storage device comprises:
a third storage portion which stores the content information,
a second reception portion which receives the service information from the management device via the Internet,
a selection portion which selects the terminal device as the transmission destination for the content information based on the service information, and
a third transmission portion which transmits the content information to the terminal device selected by the selection portion via the Internet.

2. The communication system according to claim 1, wherein
the terminal device further comprises a first control portion which, when a change in the service information has occurred, updates the service information stored in the first storage portion, and controls the first transmission portion so as to transmit the updated service information to the management device; and wherein
the management device further comprises a second control portion which controls the first reception portion so as to receive the updated service information from the terminal device, and based on the received updated service information, updates the service information stored by the second storage device.

3. The communication system according to claim 1, wherein
the third storage portion of the information storage device stores the content information being generated by the information storage device.

4. The communication system according to claim 3, wherein
the plurality of terminal device comprises a terminal device in which a type of a processing is different from other terminal devices.

5. An information storage device, comprising:
a third storage portion, which stores content information;
a second reception portion, which receives service information from a management device being connected to a private network via the Internet and manages the service information indicating a type of service provided by each of a plurality of terminal device which processes content information, an execution priority of the service and a state of the service according to service details, the plurality of terminal devices being connected to the private network;
a selection portion, which selects the terminal device to be the transmission destination of the content information, based on the service information; and
a third transmission portion, which transmits the content information to the terminal device selected by the selection portion via the Internet, wherein
one of the terminal device, which processes received content information according to service details, comprises:
a first storage portion, which stores service information indicating a type of the service, a execution priority of the service and a state of the service; and
a first transmission portion, which transmits the service information to the management device, which selects the terminal device based on the service information, and which manages the service information for transmission to the information storage device which transmits the content information it retains via the Internet.

6. The information storage device according to claim 5, wherein
the third storage portion stores the content information being generated by the information storage device.

7. The information storage device according to claim 6, wherein
the plurality of terminal devices comprises a terminal device in which a type of a processing is different from others.

8. The terminal device according to claim 5, wherein
the information storage device retains the content information being generated by the information storage device.

9. The terminal device according to claim 8, wherein
the management device receives the service information from each of the plurality of terminal device.

10. A management device, comprising:
a first reception portion, which receives, from a plurality of terminal devices, which possess received content information according to service details, the plurality of terminal devices being connected to a private network, service information indicating a type of service provided by the terminal device, an execution priority of the service and a state of the service;
a second storage portion, which stores the service information received by the reception portion; and
a second transmission portion, which transmits the service information stored by the storage portion to an information storage device, which retains the content information, and which transmits the content information to the terminal device selected based on the service information via the Internet, wherein
one of the terminal device, which processes received content information according to service details, comprises:
a first storage portion, which stores service information indicating a type of the service, a execution priority of the service and a state of the service; and
a first transmission portion, which transmits the service information to the management device, which selects the terminal device based on the service information, and which manages the service information for transmission to the information storage device which transmits the content information it retains via the Internet.

11. The management device according to claim 10, wherein
the information storage device retains the content information being generated by the information storage device.

12. The management device according to claim 11, wherein
the first reception portion that receives service information from each of the plurality of terminal device.

13. The terminal device according to claim 10, wherein
the information storage device retains the content information being generated by the information storage device.

* * * * *